US010955825B2

(12) United States Patent
Al Assad et al.

(10) Patent No.: US 10,955,825 B2
(45) Date of Patent: Mar. 23, 2021

(54) BEAM PUMPING UNIT AND METHOD OF OPERATION

(71) Applicant: General Electric Company, Schenectady, NY (US)

(72) Inventors: Omar Al Assad, Niskayuna, NY (US); Gary Hughes, Missouri City, TX (US); Anand Ramani, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 147 days.

(21) Appl. No.: 15/154,679

(22) Filed: May 13, 2016

(65) Prior Publication Data

US 2017/0329311 A1 Nov. 16, 2017

(51) Int. Cl.
| | | |
|---|---|---|
| *G05B 19/416* | (2006.01) | |
| *E21B 43/12* | (2006.01) | |
| *E21B 47/00* | (2012.01) | |
| *F04B 47/02* | (2006.01) | |
| *F04B 51/00* | (2006.01) | |
| *G01B 21/32* | (2006.01) | |

(52) U.S. Cl.
CPC .......... *G05B 19/416* (2013.01); *E21B 43/127* (2013.01); *E21B 47/0008* (2013.01); *F04B 47/026* (2013.01); *F04B 47/028* (2013.01); *F04B 51/00* (2013.01); *E21B 2043/125* (2013.01); *G01B 21/32* (2013.01)

(58) Field of Classification Search
CPC ...... F04B 51/00; F04B 47/026; F04B 47/028; G05B 19/416; G05B 2219/37371; G01B 21/32; E21B 47/0008; E21B 43/127; E21B 2043/125
See application file for complete search history.

(56) References Cited

U.S. PATENT DOCUMENTS

| | | | |
|---|---|---|---|
| 3,824,851 A | | 7/1974 | Hagar et al. |
| 3,926,047 A | * | 12/1975 | Duke ............ E21B 47/00 |
| | | | 73/152.61 |
| 4,090,405 A | | 5/1978 | McKee |

(Continued)

FOREIGN PATENT DOCUMENTS

| | | |
|---|---|---|
| EP | 0 900 916 A1 | 3/1999 |
| JP | 62150057 * | 7/1987 |

OTHER PUBLICATIONS

J J Kilgore et al., "Walking Beam Pumping Unit System Efficiency Measurements", SPE Annual Technical Conference and Exhibition, 1991.

(Continued)

*Primary Examiner* — Charles G Freay
(74) *Attorney, Agent, or Firm* — Baker Hughes Patent Operation (57) ABSTRACT

A control system for operating a beam pumping unit includes a strain gauge and a beam pumping unit controller. The strain gauge is coupled to a Samson post of the beam pumping unit, and is configured to measure a Samson post strain. The beam pumping unit controller is coupled to the strain gauge and is configured to operate the beam pumping unit to induce a variable load on a rod of the beam pumping unit. The beam pumping unit controller is further configured to receive the Samson post strain from the strain gauge and compute the variable load based on the Samson post strain.

20 Claims, 6 Drawing Sheets

(56) References Cited

U.S. PATENT DOCUMENTS

| | | | |
|---|---|---|---|
| 4,205,237 A | 5/1980 | Miller | |
| 4,631,954 A * | 12/1986 | Mills | F04B 47/028 |
| | | | 166/250.15 |
| 4,644,785 A | 2/1987 | Doyle | |
| 4,881,873 A | 11/1989 | Smith et al. | |
| 4,973,226 A * | 11/1990 | McKee | E21B 47/0008 |
| | | | 417/18 |
| 5,167,490 A * | 12/1992 | McKee | E21B 47/0006 |
| | | | 417/12 |
| 5,182,946 A | 2/1993 | Boughner et al. | |
| 5,224,834 A | 7/1993 | Westerman et al. | |
| 5,237,863 A | 8/1993 | Dunham | |
| 5,291,777 A * | 3/1994 | Chang | E21B 43/127 |
| | | | 417/18 |
| 5,549,157 A | 8/1996 | Johnson et al. | |
| 6,324,904 B1 | 12/2001 | Ishikawa et al. | |
| 6,347,553 B1 | 2/2002 | Morris et al. | |
| 6,707,950 B1 * | 3/2004 | Burns | G06T 1/00 |
| | | | 348/231.3 |
| 7,032,659 B2 * | 4/2006 | Barnes | F04B 47/02 |
| | | | 166/104 |
| 7,513,752 B2 | 4/2009 | Boone et al. | |
| 8,444,393 B2 | 5/2013 | Beck et al. | |
| 2003/0150276 A1 * | 8/2003 | Christensen | G01G 3/12 |
| | | | 73/795 |

OTHER PUBLICATIONS

L Douglas Patton, "A Computer Technique for Analyzing Pumping Well Performance", Journal of Petroleum Technology, vol. 20, Issue: 03, pp. 243-249, Mar. 1968.

International Search Report and Written Opinion issued in connection with corresponding PCT Application No. PCT/US2017/032499 dated Aug. 3, 2017.

* cited by examiner

BEAM PUMPING UNIT AND METHOD OF OPERATION

BACKGROUND

The field of the disclosure relates generally to beam pumping units and, more particularly, to a beam pumping unit having a Samson post strain gauge and a method of operation.

Most known beam pumping units (also known as surface pumping units) are used in wells to induce fluid flow, for example oil and water. Beam pumping units convert rotating motion from a prime mover, e.g., an engine or an electric motor, into reciprocating motion above the well head. This motion is in turn used to drive a reciprocating downhole pump via connection through a sucker rod string. The sucker rod string, which can extend miles in length, transmits the reciprocating motion from the well head at the surface to a subterranean piston, or plunger, and valves in a fluid bearing zone of the well. The reciprocating motion of the piston valves induces the fluid to flow up the length of the sucker rod string to the well head.

Beam pumping units are exposed to a wide range of conditions. These vary by well application, the type and proportions of the pumping unit's linkage mechanism, and the conditions of the well. The beam pumping unit imparts continually varying motion on the sucker rod string. The sucker rod string responds to the varying load conditions from the surface unit, down-hole pump, and surrounding environment by altering its own motion statically and dynamically. The sucker rod string stretches and retracts as it builds the force necessary to move the down-hole pump and fluid. The beam pumping unit, breaking away from the effects of friction and overcoming fluidic resistance and inertia, tends to generate counter-reactive interaction force to the sucker rod string exciting the dynamic modes of the sucker rod string, which causes an oscillatory response. Traveling stress waves from multiple sources interfere with each other along the sucker rod string (some constructively, others destructively) as they traverse its length and reflect load variations back to the beam pumping unit, where they can be measured.

Generally, the surface measurements are used in computing dynamometer or dynagraph cards for diagnostic analysis to identify downhole pump conditions such as, for example, and without limitation, fluid pound, fluid fill, fluid friction, gas interference, and tubing movement. Surface measurements are sometimes used in controlling the beam pumping unit. Surface load measurements are typically collected using a load cell coupled to a polished rod that suspends the sucker rod string. Such load cells are generally at an elevated position over the well head and communicate with a beam pumping unit controller using wired or wireless communication interfaces.

BRIEF DESCRIPTION

In one aspect, a control system for operating a beam pumping unit is provided. The control system includes a strain gauge and a beam pumping unit controller. The strain gauge is coupled to a Samson post of the beam pumping unit, and is configured to measure a Samson post strain. The beam pumping unit controller is coupled to the strain gauge and is configured to operate the beam pumping unit to induce a variable load on a rod of the beam pumping unit. The beam pumping unit controller is further configured to receive the Samson post strain from the strain gauge and compute the variable load based on the Samson post strain.

In another aspect, a method of operating a beam pumping unit is provided. The method includes linearly translating a rod suspended from a walking beam of the beam pumping unit. The method further includes measuring a Samson post strain using a strain gauge coupled to a Samson post pivotally coupled to the walking beam. The Samson post strain varies as a function of a rod load induced by the linear translation of the rod and a sucker rod string suspended there from. The method further includes computing, by a beam pumping unit controller, a surface card based on the Samson post strain. The method further includes operating, by the beam pumping unit controller, the beam pumping unit based on the surface card.

In yet another aspect, a beam pumping unit is provided. The beam pumping unit includes a Samson post, a walking beam, a rod, a strain gauge, and a beam pumping unit controller. The walking beam is pivotally coupled to the Samson post. The rod is coupled to the walking beam and is configured to suspend a sucker rod string within a downhole well. The strain gauge is coupled to the Samson post and is configured to measure a Samson post strain. The beam pumping unit controller is coupled to the strain gauge and is configured to compute a rod load based on the Samson post strain.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of the present disclosure relate to a beam pumping unit. The beam pumping unit includes a strain gauge coupled to the Samson post of the beam pumping unit. The strain gauge disposed on the Samson post obviates typical load cell installations at the polished rod of the beam pumping unit, which are typically elevated above the well head. The beam pumping unit further includes a beam pumping unit controller that defines at least one transfer function that relates measured Samson post strain to a load on the polished rod of the beam pumping unit. In some embodiments, the beam pumping unit controller is further configured to define multiple transfer functions corresponding to particular crank angles for the beam pumping unit. In other embodiments, the beam pumping unit controller is further configured to define multiple transfer functions corresponding to particular measured Samson post strain values. Such beam pumping unit controllers are further configured to interpolate resulting polished rod load values to determine the polished rod load for the measured crank angle and the measured Samson post strain.

Figure 1:
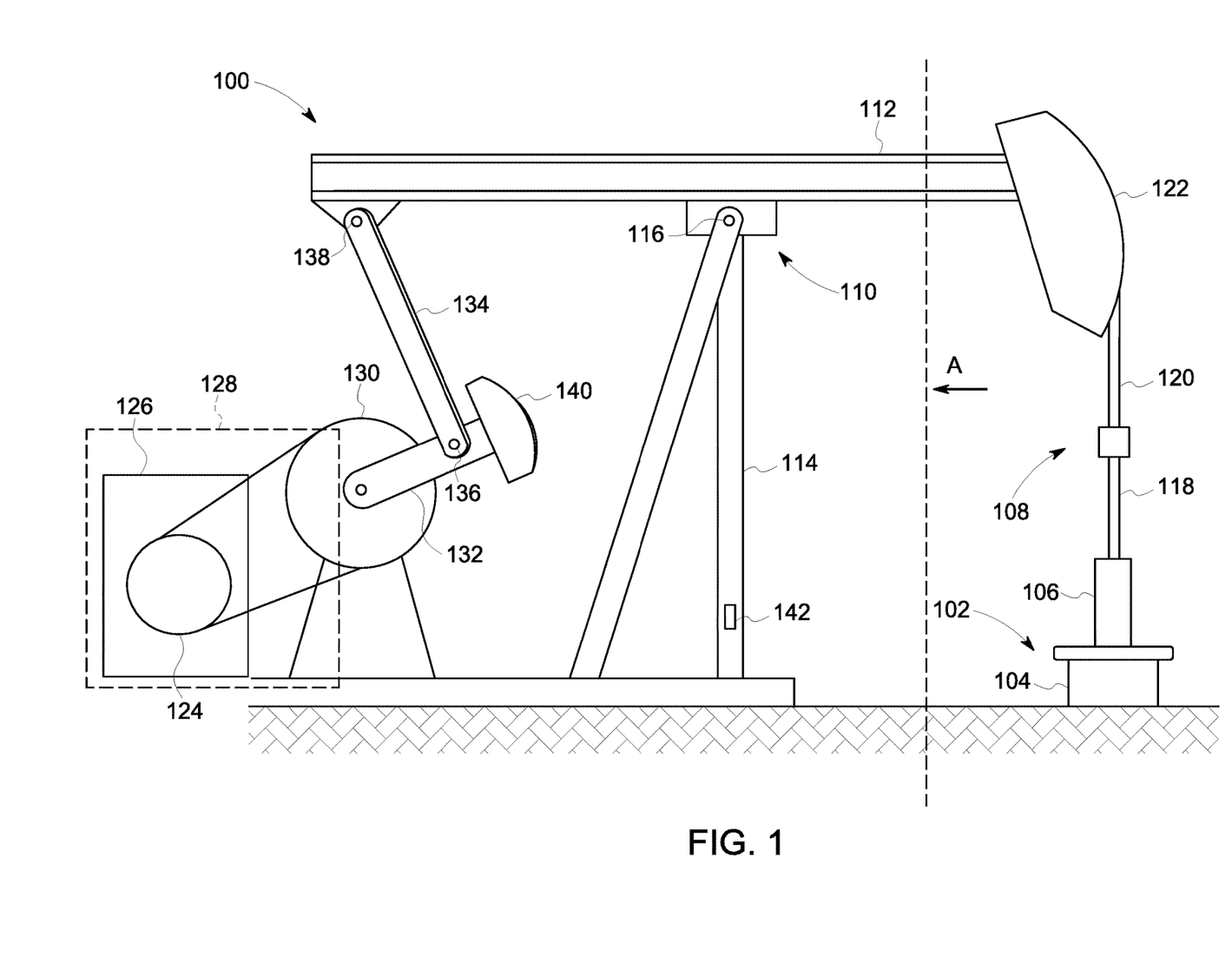
FIG. 1 is a diagram of an exemplary beam pumping unit.

FIG. 1 is a diagram of an exemplary beam pumping unit 100 for use at a well head 102 of a well that extends beneath the surface of the Earth for the purpose of producing gas and fluid from a well. Well head 102 includes an upper portion of a casing 104 and tubing 106. Casing 104 and tubing 106 extend into the well to facilitate a downhole pump (not shown) that is actuated by a rod 108 to produce the gas and fluid.

Beam pumping unit 100 includes a surface support unit 110 that suspends rod 308 in the well. Surface support unit 110 includes a walking beam 112 pivotally coupled to a Samson post 114 by a pin 116. Rod 108 includes polished rod 118 that extends into casing 104 and tubing 106 through well head 102. Rod 108 also includes a cable 120 that flexibly couples rod 108 to walking beam 112 at a horsehead 122. Samson post 114 includes any substantially vertical structure that supports the load of walking beam 112 and assemblies coupled thereto, including rod 108 and horsehead 122.

Beam pumping unit 100 includes a strain gauge 142 coupled to Samson post 114. Strain gauge 142 includes, for example, and without limitation a semiconductor strain gauge, a photoelectric gauge, a metallic wire-type strain gauge, a thin-film strain gauge, a diffused semiconductor strain gauge, a bonded resistance gauge, or any other suitable sensor for detecting strain acting on Samson post 114. Strain gauge 142 is preferably located on Samson post 114 near the ground or foundation on which Samson post 114 is fixed. For example, and without limitation, strain gauge 142, in certain embodiments, is disposed within 2 meters of the foundation. In alternative embodiments, strain gauge 142 is disposed at any other suitable height, higher or lower, that provides ease-of-access for installation and maintenance, as well as being suitable for measuring Samson post strain. In certain embodiments, strain gauge 142 may be place at any location on Samson post 114. The orientation and lateral placement of strain gauge 142 varies per embodiment in a manner that is consistent with the installation and operation of the particular style or type of strain gauge device and particular structure of Samson post 114.

Beam pumping unit 100 is driven by a prime mover 124 through a gear box 126. In certain embodiments, prime mover 124 includes an electric motor. Together, prime mover 124 and gear box 126 form a drive system 128 that, in certain embodiments, may include one or more belts, cranks, or other components. Through gear box 126, prime mover 124 turns a crank 130 having a crank arm 132. Crank arm 132 is coupled to walking beam 112 at an end opposite horsehead 122 by a pitman arm 134. Pitman arm 134 pivotally couples to crank arm 132 by a wrist pin 136, and further pivotally couples to walking beam 112 by an equalizer pin 138. Pitman arm 134 is configured to translate angular motion of crank arm 132 into linear motion of walking beam 112. The linear motion of walking beam 112 provides the reciprocal motion of rod 108 for operating the downhole pump.

On an upstroke of beam pumping unit 100, the weight of rod 108, which is suspended from walking beam 112, is transferred to crank 130 and drive system 128. Crank arm 132 includes a counterweight 140 that is configured to reduce the load on drive system 128 during an upstroke.

Figure 2:
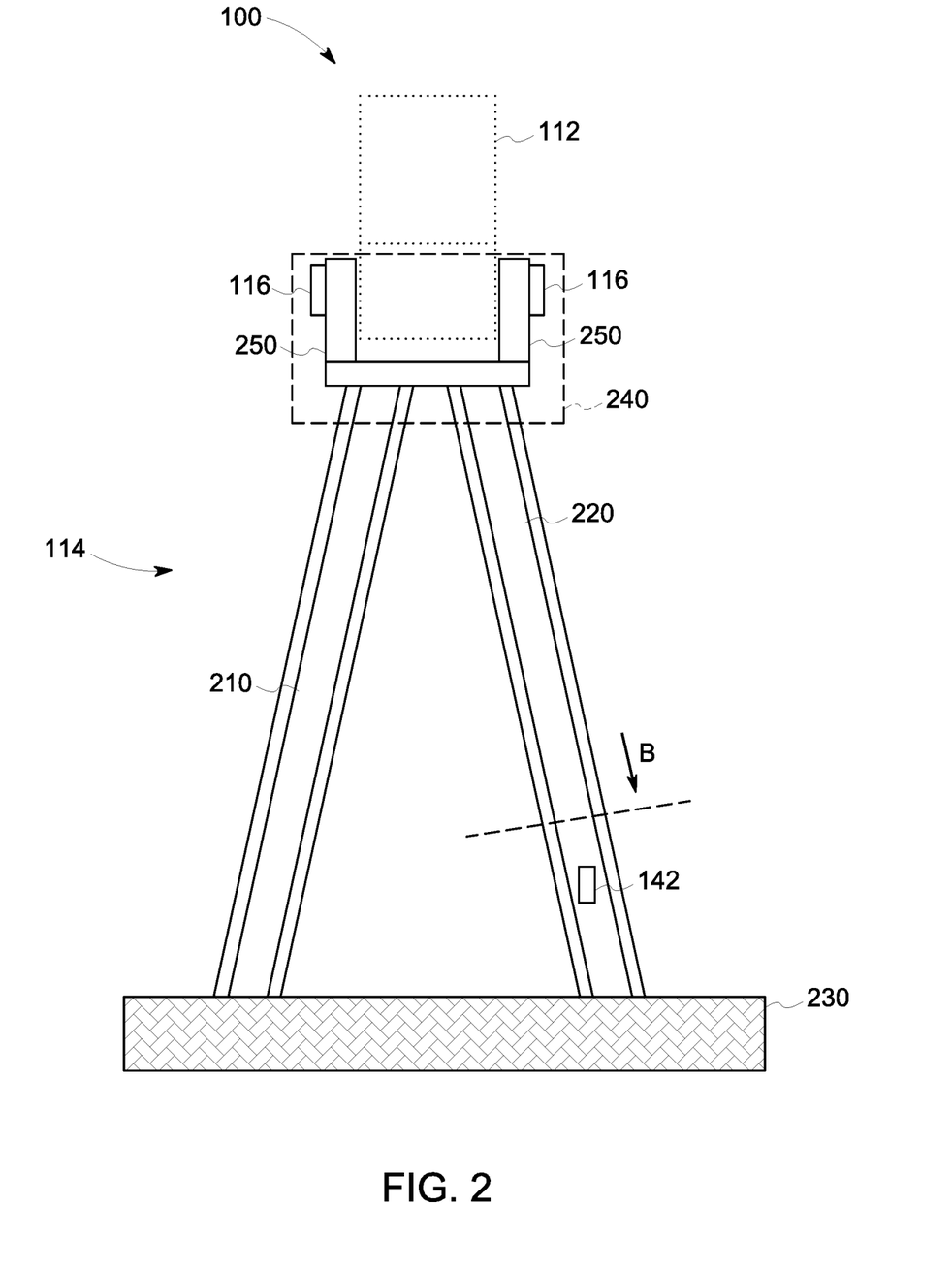
FIG. 2 is a diagram of the exemplary beam pumping unit shown in FIG. 1.

FIG. 2 is a diagram of beam pumping unit 100 from a perspective A (shown in FIG. 1). The diagram of FIG. 2 includes Samson post 114, including a first beam 210 and a second beam 220. Samson post 114 is fixed to a foundation 230. Samson post 114 supports a pivot assembly 240, to which walking beam 112 pivotally couples. Pivot assembly 240 includes saddle bearings 250 through which pin 116 is insertable to engage walking beam 112 (shown in FIG. 1). In alternative embodiments, beam pumping unit 100 may include any other suitable pivot assembly for pivotally coupling walking beam 112 to Samson post 114.

The load carried by Samson post 114 is distributed among the beams of Samson post 114, such as first beam 210 and second beam 220, which transfer the load to foundation 230. The load carried by Samson post 114 includes the weight of the structure itself, the weight of walking beam 112, and the load on polished rod 118 (not shown). During operation, the polished rod load varies as the polished rod translates linearly, up and down. Consequently, the load on Samson post 114 varies over time and over the period of one or more pump strokes. The load on Samson post 114 manifests at least in part as a strain on the structural members, such as first beam 210 and second beam 220. The strain is referred to as a Samson post strain and is measurable in either structural member of Samson post 114.

Strain gauge 142 (shown in FIG. 1) is coupled to Samson post 114 at second beam 220. Strain gauge 142, in alternative embodiments, may be coupled to first beam 210 or another structural member of Samson post 114. Strain gauge 142 is located at a height suitable for easy access for installation and maintenance. For example, in certain embodiments, strain gauge 142 is disposed at a height of no more than 2 meters from foundation 230. In alternative embodiments, strain gauge 142 is installed at any suitable height for measuring strain on Samson post 114 that is accessible for installation and maintenance.

Figure 3:
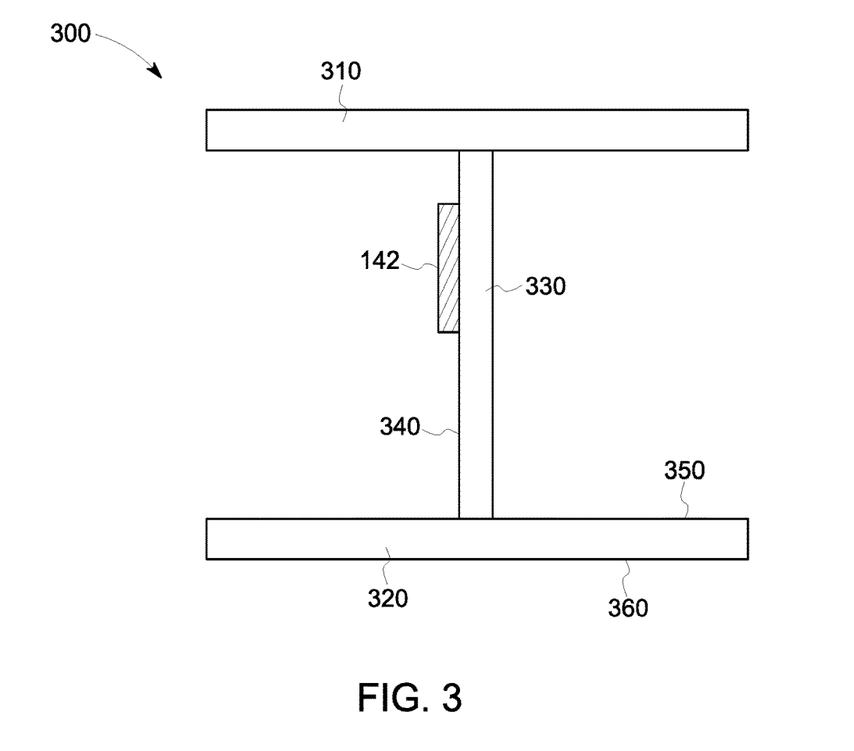
FIG. 3 is a cross-sectional diagram of an exemplary I-beam for the Samson post shown in FIGS. 1 and 2.

FIG. 3 is a cross-sectional diagram of an exemplary I-beam 300 for use as a structural member of Samson post 114 (shown in FIGS. 1 and 2). The cross-sectional diagram is from a perspective B (shown in FIG. 2). I-beam 300 includes a first flange 310, a second flange 320, and a web 330. I-beam 300 is typically manufactured from steel or a derivative thereof. Alternatively, I-beam 300 is manufactured from any material suitable to support the loads acting on Samson post 114, including, for example, and without limitation, wood, aluminum, and cast iron. Strain gauge 142 (shown in FIGS. 1 and 2) is disposed on a web surface 340 and is configured to measure strain in I-beam 300. In alternative embodiments, strain gauge 142 is disposed on an inner flange surface 350 or an outer flange surface 360.

Figure 4:
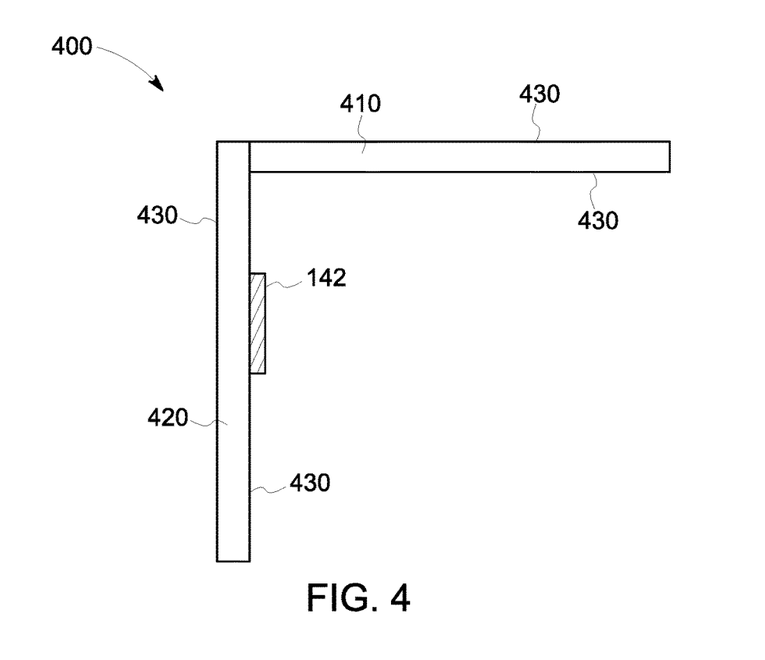
FIG. 4 is a cross-sectional diagram of an exemplary angle-iron for the Samson post shown in FIGS. 1 and 2.

FIG. 4 is a cross-sectional diagram of an exemplary angle-iron 400 for use as a structural member of Samson post 114 (shown in FIGS. 1 and 2). The cross-sectional diagram is from a perspective B (shown in FIG. 2). Angle-iron 400 includes a horizontal member 410 and a vertical member 420, each of which has surfaces 430. Angle-iron 400 is typically manufactured from steel or a derivative thereof. Alternatively, angle-iron 400 is manufactured from any material suitable to support the loads acting on Samson post 114, including, for example, and without limitation, aluminum and cast iron. Strain gauge 142 is coupled to surface 430 and is configured to measure strain in angle-iron 400.

Figure 5:
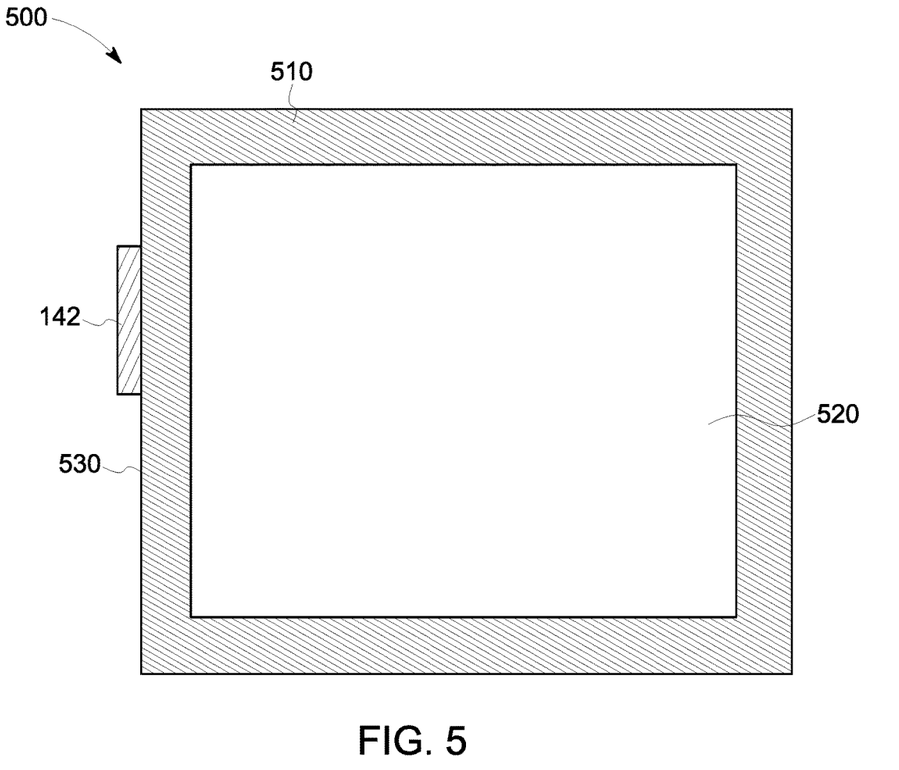
FIG. 5 is a cross-sectional diagram of an exemplary box beam for the Samson post shown in FIGS. 1 and 2.

FIG. 5 is a cross-sectional diagram of an exemplary box beam 500 for use as a structural member of Samson post 114 (shown in FIGS. 1 and 2). The cross-sectional diagram is from a perspective B (shown in FIG. 2). Box beam 500 includes a rectangular structure 510 and is typically manufactured from steel or a derivative thereof. Alternatively, box beam 500 is manufactured from any material suitable to support the loads acting on Samson post 114, including, for example, and without limitation, wood, aluminum, and cast iron. Structure 510 defines an interior 520 and an outer surface 530. Strain gauge 142 is coupled to outer surface 530 and is configured to measure strain in box beam 500.

Figure 6:
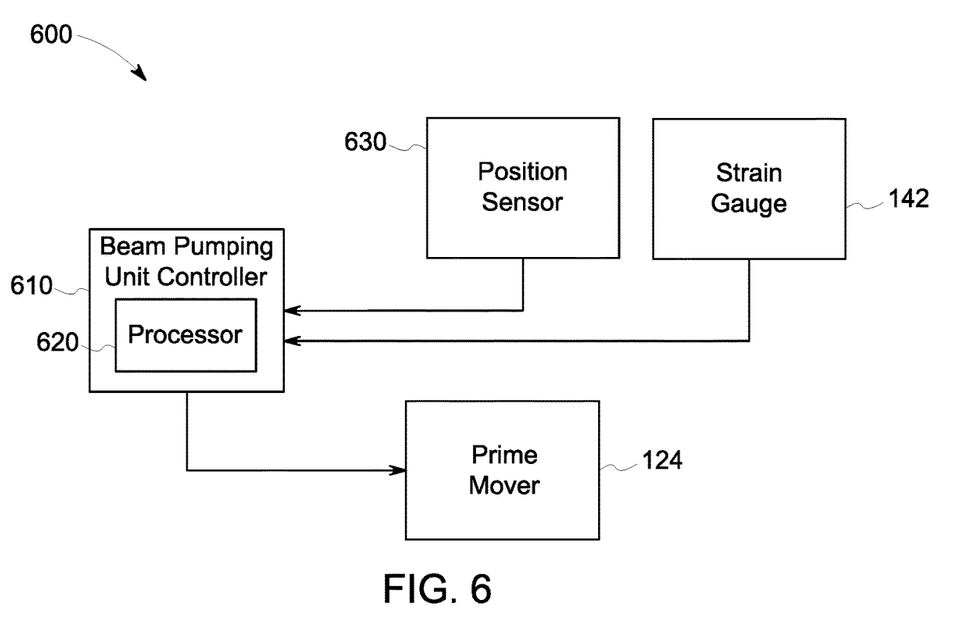
FIG. 6 is a block diagram of control system for the beam pumping unit shown in FIGS. 1 and 2.

FIG. 6 is a block diagram of a control system 600 for use with beam pumping unit 100 (shown in FIGS. 1 and 2). Control system 600 includes a beam pumping unit controller 610 having a processor 620. Control system 600 further includes a position sensor 630 and strain gauge 142 (shown in FIGS. 1 and 2), each communicatively coupled to beam pumping unit controller 610. Referring to FIGS. 1, 2, and 6, beam pumping unit controller 610 is further communicatively coupled to prime mover 124 (shown in FIG. 1) for controlling operation of beam pumping unit 100. For example, and without limitation, beam pumping unit controller 610 controls the pumping speed at which prime mover 124 operates beam pumping unit 100.

Position sensor 630 is configured to measure a crank angle. The crank angle is a value, expressed in degrees or radians, for example, describing a rotational position of crank arm 132, which is linked to walking beam 112 by Pitman arm 134 and causes the linear translation of polished rod 118. In certain embodiments, position sensor 630 includes an encoder configured to generate a position signal indicative of the crank angle, and transmits the position signal to beam pumping unit controller 610. In certain embodiments, position sensor 630 is coupled to a motor shaft and the measurement is related to a position of crank arm 132 through known gear ratios. In alternative embodiments, position sensor 630 may be coupled directly to crank 130 or crank arm 132.

Strain gauge 142 is coupled to Samson post 114 and is configured to measure a Samson post strain. The Samson post strain is a value, expressed in pounds per square inch (PSI), for example, describing the load carried by Samson post 114. The Samson post strain varies over the period of one or more pump strokes. The Samson post strain correlates to the variable polished rod load and is characterized by one or more transfer functions that relate polished rod load to Samson post strain and crank angle. The polished rod load is generally expressed as a torque value in pounds of force (lbf), for example. The Samson post strain is usable as a surrogate measure of polished rod load for the purpose of controlling beam pumping unit 100 and for computing dynamometer and surface cards for diagnostics and analysis.

In certain embodiments, beam pumping unit controller 610 defines multiple transfer functions, each corresponding to a particular crank angle and relating Samson post strain to polished rod load. Each transfer function defines polished rod load as a function of Samson post strain and at a particular crank angle. The transfer functions are determined using a calibration procedure that includes applying known polished rod loads and collecting multiple measurements of Samson post strain at various crank angles. The known polished rod loads include, in certain embodiments, 15,000, 20,000, 25,000, and 30,000 lbf, for example, and without limitation.

During operation, a Samson post strain is measured by strain gauge 142 and a crank angle is determined by position sensor 630. Given the crank angle, beam pumping unit controller 610 selects two transfer functions that correspond to crank angles that bound the measured crank angle. For example, a measured crank angle of 60 degrees is bound by crank angle values 45 degrees and 90 degrees (i.e., 45<60<90 degrees). Beam pumping unit controller 610 uses the two transfer functions to compute polished rod load values based on the Samson post strain measured by strain gauge 142. Beam pumping unit controller 610 then interpolates the resulting polished rod load values to determine a polished rod load value for the measured crank angle. The polished rod load value is then available to beam pumping unit controller 610 for use in computing dynamometer cards, surface cards, or for controlling beam pumping unit 100.

In certain embodiments, beam pumping unit controller 610 defines multiple transfer functions, each corresponding to a particular Samson post strain value measured by strain gauge 142 and relating crank angle to polished rod load. Each transfer function defines polished rod load as a function of crank angle measured by position sensor 630 for a particular measured Samson post strain value. The transfer functions are determined using a calibration procedure that includes applying known polished rod loads and collecting multiple measurements of Samson post strain at various crank angles.

During operation, a Samson post strain is measured by strain gauge 142 and a crank angle is determined by position sensor 630. Given the Samson post strain value, beam pumping unit controller 610 selects two transfer functions that correspond to Samson post strain values that bound the measured Samson post strain value. Beam pumping unit controller 610 uses the two transfer functions to compute polished rod load values based on the crank angle measured by position sensor 630. Beam pumping unit controller 610 then interpolates the resulting polished rod load values to determine a polished rod load value for the measured Samson post strain value. The polished rod load value is then available to beam pumping unit controller 610 for use in computing dynamometer cards, surface cards, or for controlling beam pumping unit 100.

Figure 7:
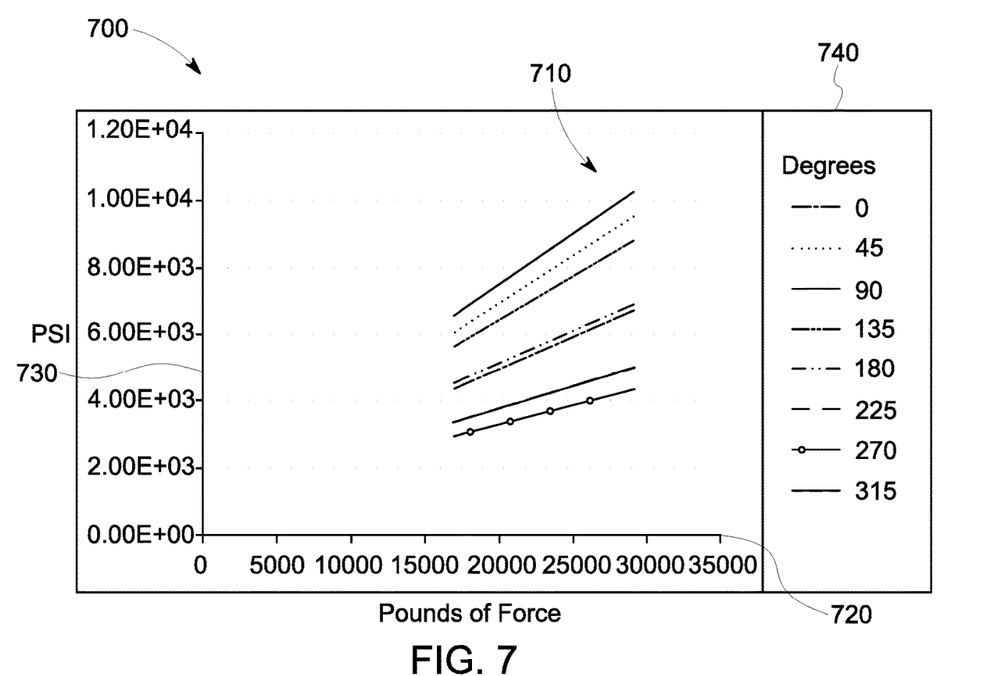
FIG. 7 is a plot illustrating transfer functions that relate Samson post strain and polished rod load for the beam pumping unit shown in FIGS. 1 and 2.

FIG. 7 is a plot 700 illustrating transfer functions 710 that relate polished rod load 720 and Samson post strain 730 for beam pumping unit 100 (shown in FIGS. 1 and 2). Plot 700 includes a horizontal axis defining a linear scale representing polished rod load 720 in lbf, the scale ranging from 0 lbf to 35,000 lbf. Plot 700 includes a vertical axis defining a linear scale representing Samson post strain 730 in PSI, the scale ranging from 0 PSI to 12,000 PSI. Each of transfer functions 710 expresses polished rod load 720, in lbf, as a continuous function of Samson post strain 730, in PSI, which is measured, for example, and without limitation, by strain gauge 142 (shown in FIGS. 1 and 2). Each of transfer functions 710 represents the polished rod load-Samson post strain relationship for a particular crank angle 740, which is measured, for example, and without limitation, by position sensor 630. Plot 700 includes transfer functions 710 for eight different crank angles 740, beginning with zero degrees and incrementing by 45 degrees until completing a 360 degree rotation.

Figure 8:
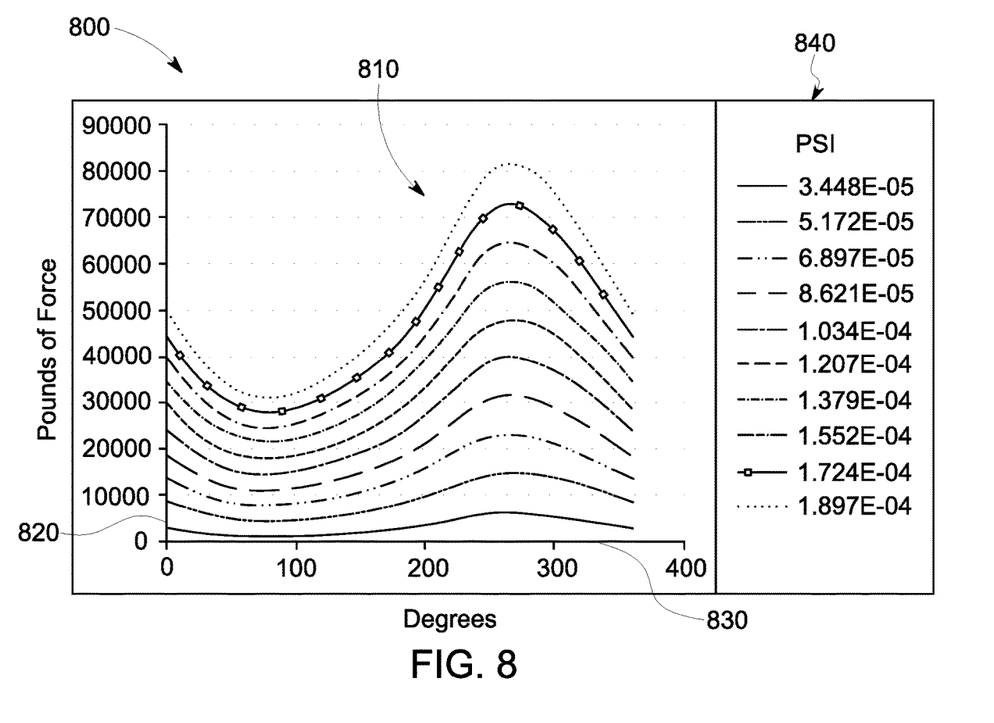
FIG. 8 is a plot illustrating transfer functions that relate crank angle and polished rod load for the beam pumping unit shown in FIGS. 1 and 2.

FIG. 8 is a plot 800 illustrating transfer functions 810 that relate polished rod load 820 and crank angle 830 for beam pumping unit 100 (shown in FIGS. 1 and 2). Plot 800 includes a horizontal axis defining a linear scale representing crank angle 830 in degrees, the scale ranging from 0 degrees to 400 degrees. Plot 800 includes a vertical axis defining a linear scale representing polished rod load 820 in lbf, the scale ranging from 0 lbf to 90,000 lbf. Each of transfer functions 810 expresses polished rod load 820, in lbf, as a continuous function of crank angle 830, in degrees, which is measured, for example, and without limitation, by position sensor 630. Each of transfer functions 810 represents the polished rod load-Samson post strain relationship for a particular Samson post strain 840, in PSI, which is measured, for example, and without limitation, by strain gauge 142. Plot 800 includes transfer functions 810 for ten different Samson post strains 840, ranging from 0.00003448 PSI to 0.0001897 PSI.

Figure 9:
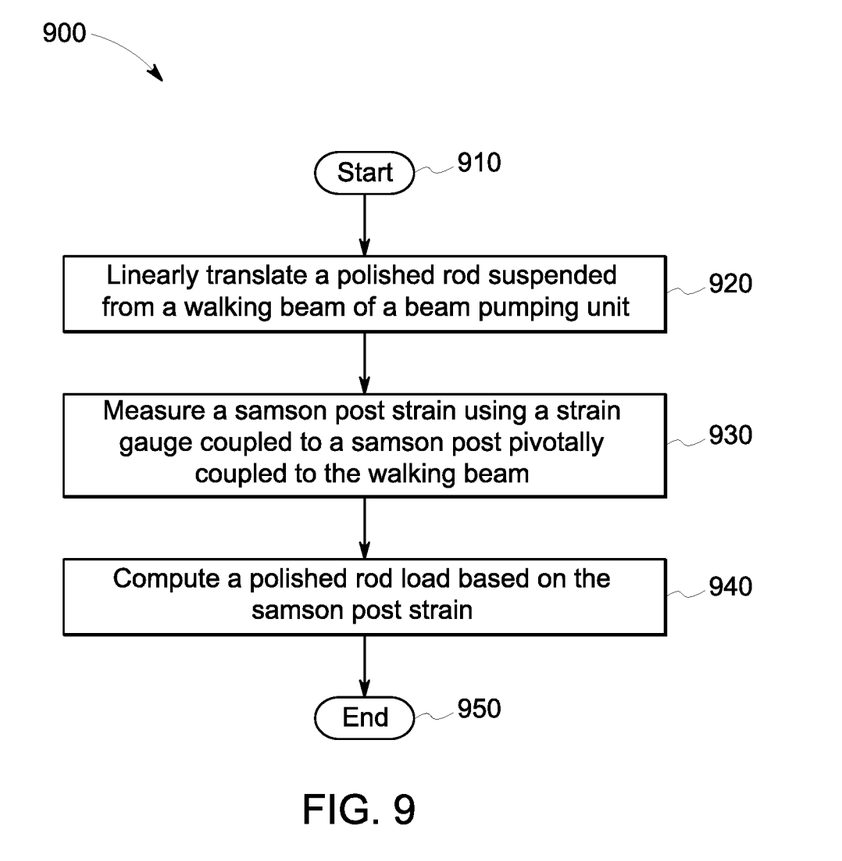
FIG. 9 is a flow diagram of an exemplary method of operating the beam pumping unit shown in FIGS. 1 and 2.

FIG. 9 is a flow diagram of an exemplary method 900 of operating beam pumping unit 100 (shown in FIGS. 1 and 2). The method begins at a start step 910. Referring to FIGS. 1, 2, and 6, beam pumping unit controller 610, at a translation step 920, operates prime mover 124 to generate a linear translation of polished rod 118, which is suspended from horsehead 122 of walking beam 112 by cable 120. Polished rod 118 suspends a sucker rod string (not shown) beneath well head 102. Prime mover 124 turns crank 130 using drive system 128. As crank 130 turns, crank arm 132 rotates. Rotation of crank 130 and crank arm 132 is measurable, for example, and without limitation, by position sensor 630, and is referred to as crank angle. Rotation of crank arm 132, which is linked to walking beam 112 by Pitman arm 134, causes walking beam 112 to pivot on Samson post 114, and further causes the linear translation of polished rod 118. The linear translation of polished rod 118 and the sucker rod string induces a variable load at the polished rod.

At a measuring step 930, a Samson post strain is measured by strain gauge 142 coupled to Samson post 114. Beam pumping unit controller 610 receives the measured Samson post strain value from strain gauge 142 and, at a computing step 940, computes a polished rod load based on the Samson post strain.

In certain embodiments, beam pumping unit controller 610 also receives a crank angle measured by position sensor 630. Beam pumping unit controller 610, in such embodiments, computes the polished rod load based on the Samson post strain and the crank angle.

In certain embodiments, method 900 further includes a calibration step. During calibration, a zero-load is applied to polished rod 118. Beam pumping unit controller 610 then measures a zero-load Samson post strain at strain gauge 142 corresponding to the zero-load applied to polished rod 118. Multiple calibrated loads are then applied to polished rod 118 and corresponding Samson post strain measurements are collected from strain gauge 142 at beam pumping unit controller 610. Beam pumping unit controller 610 then defines the various transfer functions according to the measured Samson post strain values corresponding to the zero-load and the multiple calibrated loads.

Method 900 ends at an end step 950.

The above described beam pumping unit includes a strain gauge coupled to the Samson post of the beam pumping unit. The strain gauge disposed on the Samson post obviates typical load cell installations at the polished rod of the beam pumping unit. The beam pumping unit further includes a beam pumping unit controller that defines at least one transfer function that relates measured Samson post strain to a load on the polished rod of the beam pumping unit. In some embodiments, the beam pumping unit controller is further configured to define multiple transfer functions corresponding to particular crank angles for the beam pumping unit. In other embodiments, the beam pumping unit controller is further configured to define multiple transfer functions corresponding to particular measured Samson post strain values. Such beam pumping unit controllers are further configured to interpolate resulting polished rod load values to determine the polished rod load for the measured crank angle and the measured Samson post strain.

An exemplary technical effect of the methods, systems, and apparatus described herein includes at least one of: (a) reducing costs of polished rod load sensors through use of lower-cost strain gauges; (b) improving maintenance cost by placement of lower-cost strain gauges on the Samson post; (c) improving installation and maintenance safety by placement of strain gauges on the Samson post; and (d) improving load sensor reliability by placement of strain gauges on the Samson post versus load cells elevated above the well head on the polished rod.

Exemplary embodiments of methods, systems, and apparatus for beam pumping unit controllers are not limited to the specific embodiments described herein, but rather, components of systems and/or steps of the methods may be utilized independently and separately from other components and/or steps described herein. For example, the methods may also be used in combination with other non-conventional beam pumping units, and are not limited to practice with only the systems and methods as described herein. Rather, the exemplary embodiment can be implemented and utilized in connection with many other applications, equipment, and systems that may benefit from reduced cost, reduced complexity, commercial availability, improved reliability at high temperatures, and increased memory capacity.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for operating a beam pumping unit, said control system comprising:
   a strain gauge coupled to a Samson post of the beam pumping unit, said strain gauge configured to measure a Samson post strain;
   a beam pumping unit controller coupled to said strain gauge, said beam pumping unit controller configured to:
      perform a calibration, wherein a zero-load is applied to a rod of the beam pumping unit and the unit controller measures a zero-load strain from the strain gauge and at least an additional calibrated load is applied to the rod and the unit controller measures the load from the strain gauge, and wherein various transfer functions are defined corresponding to the zero-load and at least one additional calibrated load;
      operate the beam pumping unit to induce a variable load on the rod of the beam pumping unit;
      receive the Samson post strain from said strain gauge;
      compute the variable load based on the Samson post strain; and
      compute at least one dynamometer card based at least in part on the computed variable load.

2. The control system in accordance with claim 1 further comprising a position sensor configured to measure a crank angle of a crank of the beam pumping unit, wherein said beam pumping unit controller is further coupled to said position sensor and further configured to compute the variable load based on the crank angle.

3. The control system in accordance with claim 2, wherein said beam pumping unit controller is further configured to:
   wherein the various transfer functions are a plurality of transfer functions;
   select first and second transfer functions, of the plurality of transfer functions, corresponding respectively to first and second crank angle values of the plurality of crank angles, wherein the crank angle measured by said position sensor is bound by the first and second crank angle values;
   compute first and second rod load values using the first and second transfer functions, respectively, and the Samson post strain; and
   interpolate the first and second rod load values based on the crank angle measured by said position sensor to determine the variable load.

4. The control system in accordance with claim 2, wherein said beam pumping unit controller is further configured to:
   wherein the various transfer functions are a plurality of transfer functions;

select first and second transfer functions, of the plurality of transfer functions, corresponding respectively to first and second Samson post strain values of the plurality of Samson post strain values, wherein the Samson post strain measured by said strain gauge is bound by the first and second Samson post strain values;

compute first and second rod load values using the first and second transfer functions, respectively, and the crank angle; and interpolate the first and second rod load values based on the Samson post strain measured by said strain gauge to determine the variable load.

5. The control system in accordance with claim 2, wherein said position sensor comprises an encoder coupled to the crank of the beam pumping unit, said encoder configured to:

generate a position signal indicative of the crank angle based on a rotational position of the crank; and transmit the position signal to said beam pumping unit controller.

6. The control system in accordance with claim 1, wherein said strain gauge comprises a semiconductor strain gauge.

7. The control system in accordance with claim 1, wherein said beam pumping unit controller is further configured to modify a pump speed of the beam pumping unit based on the variable load.

8. A method of operating a beam pumping unit, said method comprising:

linearly translating a rod suspended from a walking beam of the beam pumping unit;

measuring a Samson post strain using a strain gauge coupled to a Samson post pivotally coupled to the walking beam, the Samson post strain varying as a function of a rod load induced by the linear translation of the rod and a sucker rod string suspended there from;

computing, by a beam pumping unit controller, a dynamometer card based on the variable load computed from the Samson post strain;

operating, by the beam pumping unit controller, the beam pumping unit based on the dynamometer card; and performing a calibration, wherein a zero-load is applied to a rod of the beam pumping unit and the unit controller measures a zero-load strain from the strain gauge and at least an additional calibrated load is applied to the rod and the unit controller measures the load from the strain gauge, and wherein various transfer functions are defined corresponding to the zero-load and at least one additional calibrated load.

9. The method in accordance with claim 8, wherein computing the dynamometer card comprises computing the rod load based on the Samson post strain.

10. The method in accordance with claim 9 further comprising:

operating a prime mover to rotate a crank having a crank arm linked to the walking beam and inducing the linear translation of the rod; and determining a crank angle of the crank using a position sensor coupled thereto, wherein computing the rod load comprises computing the rod load based on the Samson post strain and the crank angle.

11. The method in accordance with claim 10, wherein computing the rod load further comprises:

wherein the various transfer functions are a plurality of transfer functions;

selecting first and second transfer functions, of the plurality of transfer functions, corresponding respectively to first and second crank angle values of the plurality of crank angles, wherein the crank angle determined by the position sensor is bound by the first and second crank angle values;

computing first and second rod load values using the first and second transfer functions, respectively, and the Samson post strain; and interpolating the first and second rod load values based on the crank angle measured by the position sensor to determine the rod load.

12. The method in accordance with claim 10, wherein computing the rod load further comprises:

wherein the various transfer functions are a plurality of transfer functions;

selecting first and second transfer functions, of the plurality of transfer functions, corresponding respectively to first and second Samson post strain values of the plurality of Samson post strain values, wherein the Samson post strain measured by the strain gauge is bound by the first and second Samson post strain values;

computing first and second rod load values using the first and second transfer functions, respectively, and the crank angle; and interpolating the first and second rod load values based on the Samson post strain measured by said strain gauge to determine the rod load.

13. The method in accordance with claim 9 further comprising collecting the plurality of Samson post strain measurements at a plurality of crank angles of the beam pumping unit.

14. The method in accordance with claim 9, wherein calibrating the beam pumping unit controller comprises defining a transfer function relating the rod load to the Samson post strain.

15. A beam pumping unit, comprising:

a Samson post;

a walking beam pivotally coupled to said Samson post;

a rod coupled to said walking beam and configured to suspend a sucker rod string within a downhole well;

a strain gauge coupled to said Samson post and configured to measure a Samson post strain; and a beam pumping unit controller coupled to said strain gauge and configured to perform a calibration, wherein a zero-load is applied to a rod of the beam pumping unit and the unit controller measures a zero-load strain from the strain gauge and at least an additional calibrated load is applied to the rod and the unit controller measures the load from the strain gauge, and wherein various transfer functions are defined corresponding to the zero-load and at least one additional calibrated load and compute a rod load based on the Samson post strain and at least one dynamometer card based at least in part on the computed variable load.

16. The beam pumping unit in accordance with claim 15 further comprising:

a prime mover; and a crank rotatably coupled to said prime mover, said crank comprising a crank arm linked to said walking beam and operable to convert rotation of said prime mover into linear translation of said rod.

17. The beam pumping unit in accordance with claim 16 further comprising a position sensor configured to determine a crank angle of said crank, wherein said beam pumping unit controller is further configured to compute the rod load based on the crank angle.

18. The beam pumping unit in accordance with claim 17, wherein said Samson post comprises a plurality of beams configured to distribute the weight of said walking beam and the rod load.

19. The beam pumping unit in accordance with claim 18, wherein each of said plurality of beams comprises a steel I-beam comprising first and second flanges, and a web coupled perpendicularly between said first and second flanges, and wherein said strain gauge is coupled to a surface of said web.

20. The beam pumping unit in accordance with claim 15, wherein said strain gauge is disposed on said Samson post at most 2 meters from a foundation on which said Samson post is fixed.

* * * * *